(No Model.) 8 Sheets—Sheet 4.
A. G. COLLINS.
MEASURING AND PROPORTIONING MACHINE.

No. 559,680. Patented May 5, 1896.

Attest:
Charles Pickles
Stanley Stoner

Inventor:
Alonzo G. Collins
By
Knight Bro
Attys (No Model.)  
A. G. COLLINS.  
MEASURING AND PROPORTIONING MACHINE.  
No. 559,680. Patented May 5, 1896.

Attest:  
Charles Pickles.  
Stanley Stoner

Inventor:  
Alonzo G. Collins.  
By Knight Bro.  
Attys (No Model.) 8 Sheets—Sheet 7.

A. G. COLLINS.
MEASURING AND PROPORTIONING MACHINE.

No. 559,680. Patented May 5, 1896.

Attest:
Charles Pickle
Stanley Stoner

Inventor:
Alonzo G. Collins,
By Knight Bro
Attys (No Model.) 8 Sheets—Sheet 8.
A. G. COLLINS.
MEASURING AND PROPORTIONING MACHINE.

No. 559,680. Patented May 5, 1896.

Attest
Charles Pickles
Stanley Stoner

Inventor
Alonzo G. Collins.
By Knight Bro
Attys

UNITED STATES PATENT OFFICE.

ALONZO G. COLLINS, OF ST. LOUIS, MISSOURI, ASSIGNOR OF ONE-HALF TO HORD & BERG, OF SAN ANTONIO, TEXAS.

MEASURING AND PROPORTIONING MACHINE.

SPECIFICATION forming part of Letters Patent No. 559,680, dated May 5, 1896.

Application filed March 13, 1895. Serial No. 541,529. (No model.)

*To all whom it may concern:*

Be it known that I, ALONZO G. COLLINS, residing at the city of St. Louis, in the State of Missouri, have invented a new and useful Improvement in Measuring and Proportioning Machines, of which the following is a specification.

My invention relates to a device by which the mixing of various ingredients in certain desired proportions may be easily and accurately accomplished; and it possesses features of novelty hereinafter specifically indicated.

Referring to the drawings forming part of this specification, Fig. 7 illustrates a vertical section of the same along the line 7 7 of Fig. 5.

The same numbers refer to the same or similar parts throughout the several drawings.

1 and 1' are the two receptacles or buckets into which the desired amount of material is deposited from the chutes 2 and 2'.

3 is a hopper, into which the material when measured is discharged.

4 is the frame, having central standards 4' 4' for supporting the device.

Figures 2, 3:
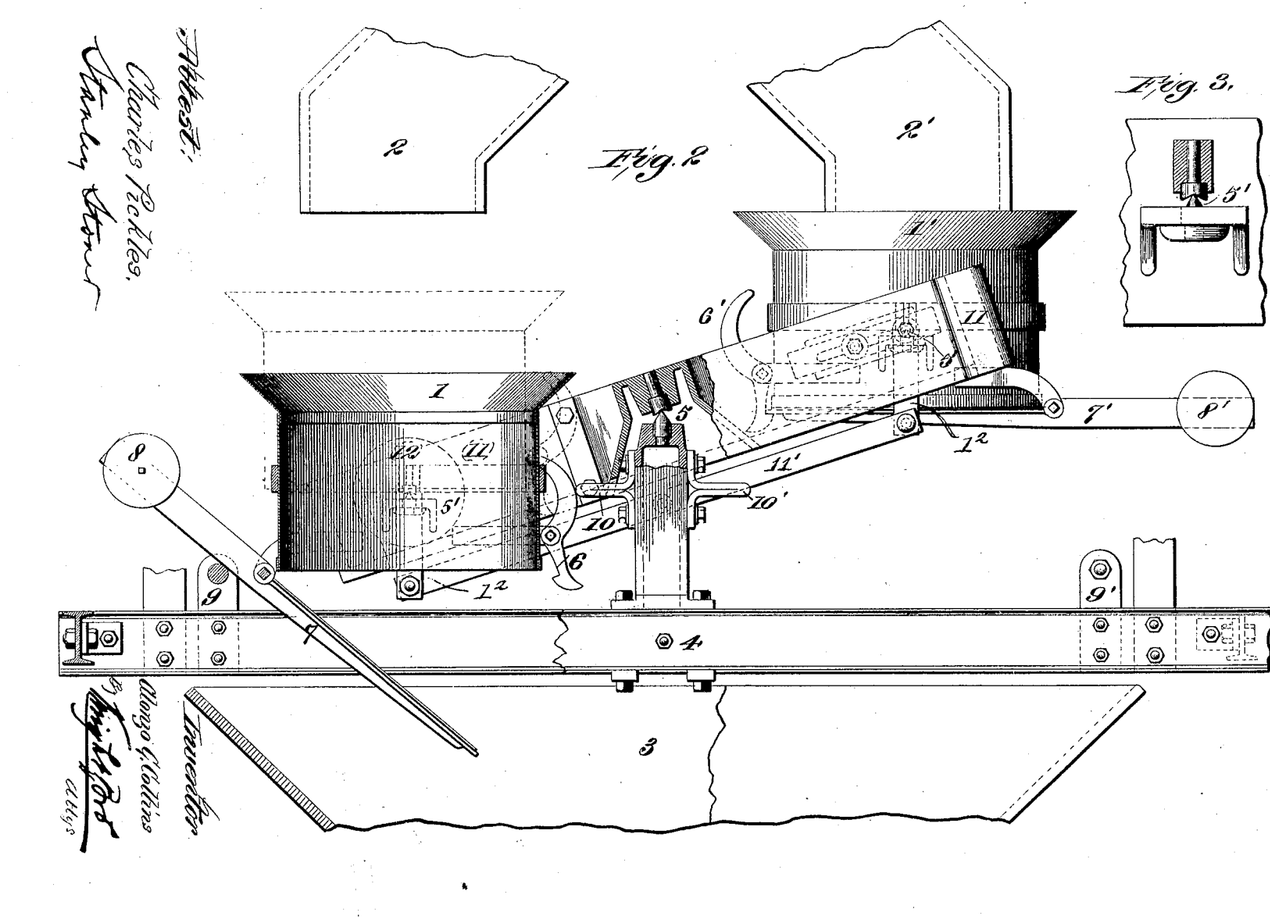
Fig. 2 illustrates a view, part in elevation and part in section, of the buckets, showing the bottom of one opened to empty it and the bottom of the other closed for filling.
Fig. 3 illustrates in detail the method of pivoting the buckets to their side supports and of pivoting said side supports to their standards.

5, Fig. 2, is the pivot upon which the frame bearing the buckets is balanced, and 5', Fig. 3, are similar pivots upon which the buckets are balanced upon said frame.

6 and 6' are trip-hooks to secure the bottom 7 7' of the buckets in position.

8 8' are counterbalancing-weights attached to the bottoms.

9 9' are bars attached to the frame 4, placed at a suitable position to open bottoms 7 7' when the buckets are lowered, as shown in Fig. 2.

10 10' are obstructions placed to disengage trip-hooks 6 and thus open the bucket-bottoms.

Figure 4:
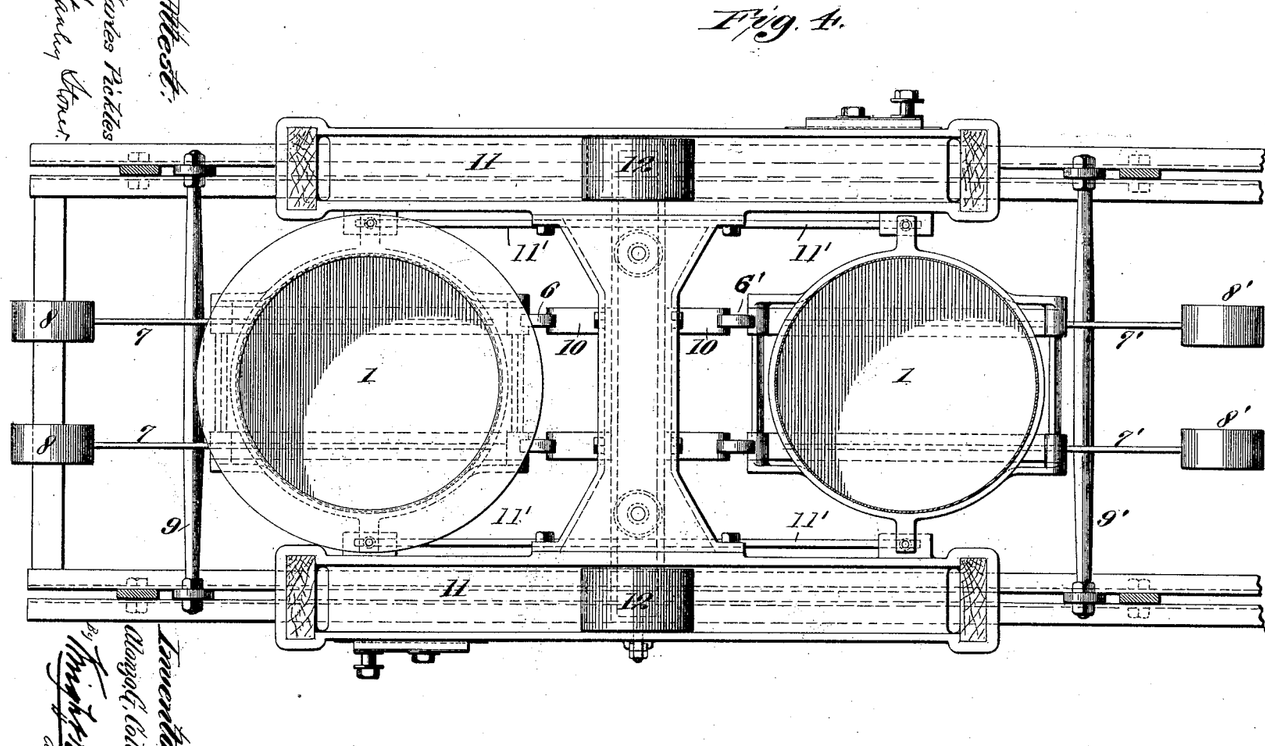
Fig. 4 illustrates a top view of the buckets and their supporting mechanism.

11 (shown clearly in Fig. 4) are grooved channel-bars to the balance device, and 12 12 are roller-weights placed therein.

11' 11' are parallel bars pivoted to the central standards 4' 4' and also pivoted to the depending rigid arms $1^2 1^2$, secured to the receptacles or buckets 1 1', for preventing the oscillation of the latter on their supporting-bars and maintaining them in upright positions. These bars 11' 11' compel the buckets to move sidewise in a vertical plane, for the reason that they prevent the receptacles or buckets from being overbalanced by the weights 8 8'.

Figure 1:
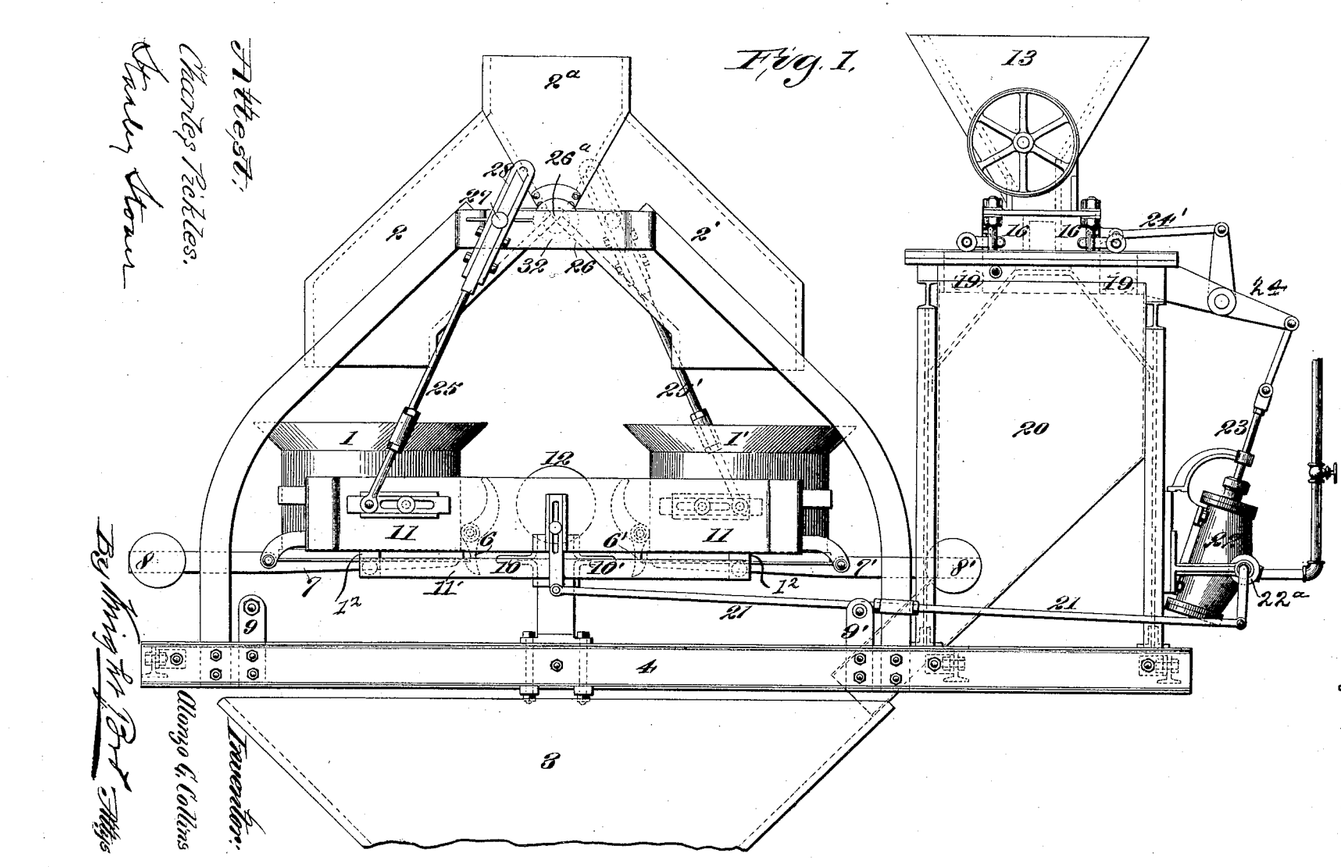
Figure 1 illustrates a side elevation of the entire device.
Figure 10:
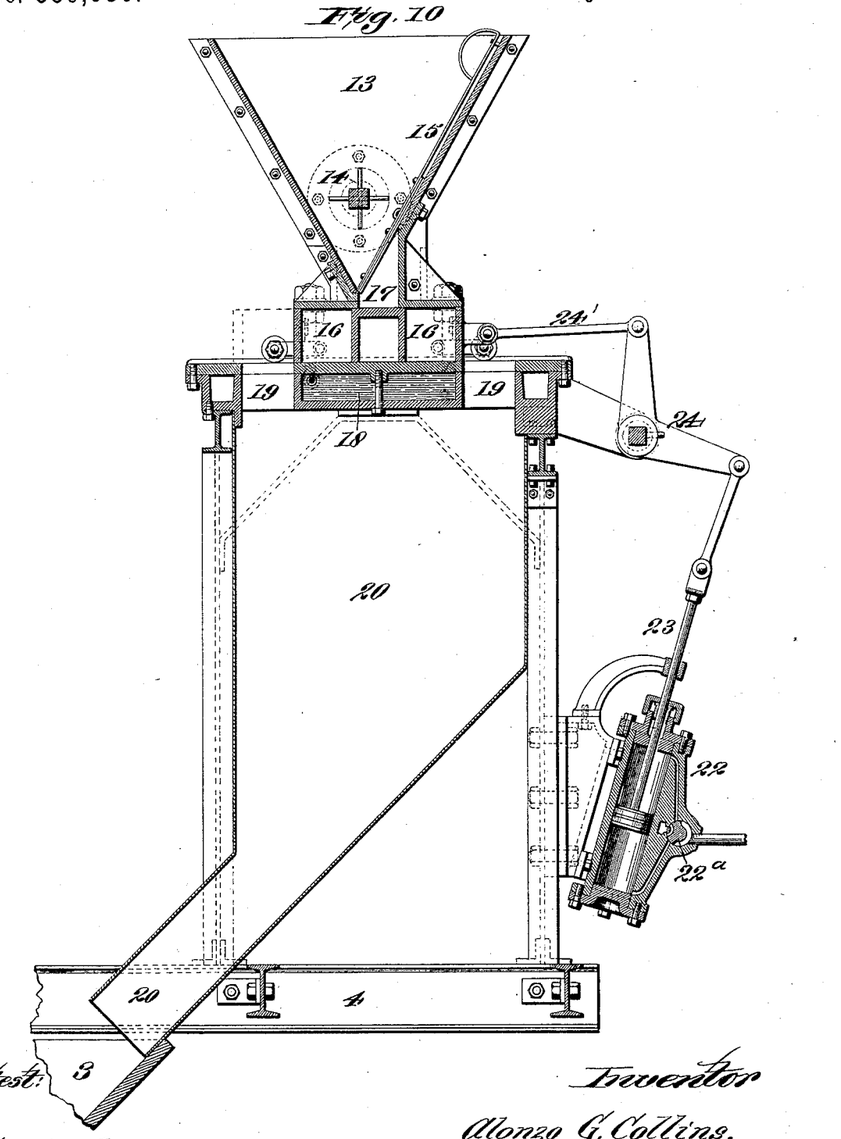
Fig. 10 illustrates in detail a section of the device for measuring in proper proportion a second or other ingredient to be mixed with the material measured in the device already illustrated.

13, Figs. 1 and 10, is a receptacle in which are placed additional materials for proportioning and ultimately mixing with the material measured by the apparatus already described. 14 is an agitator placed therein.

15 are sliding valves to control the amount of material measured.

16 are chambers in a charger adapted to be brought coincident with chamber 17, opening from 13, and to carry the material received from 17 over passage 19, there to be discharged into the hopper 20 and thence into hopper 3 to mix with the original material from the buckets 1 1'.

18 is a chamber adapted to carry water below the charger-carrying chambers 16, for the purpose of cooling or heating the material, if such be necessary.

21 is a connecting rod or bar attached to one of the channel-bars carrying buckets 1 1'. It is attached to a sliding arm, that the amount of its motion may be controlled as desired.

22 is an engine of any ordinary construction, the valve $22^a$ of which is adapted to be operated by the movement of connecting-rod 21.

23 is a piston-rod, and 24 is a lever operated by 23 and adapted to move the charger to which it is connected by the rod 24'.

25 25' are rods connected by means of a sliding joint to the channel-bars 11, said sliding joint being adapted to regulate the amount of motion imparted thereto.

Figures 5, 6:
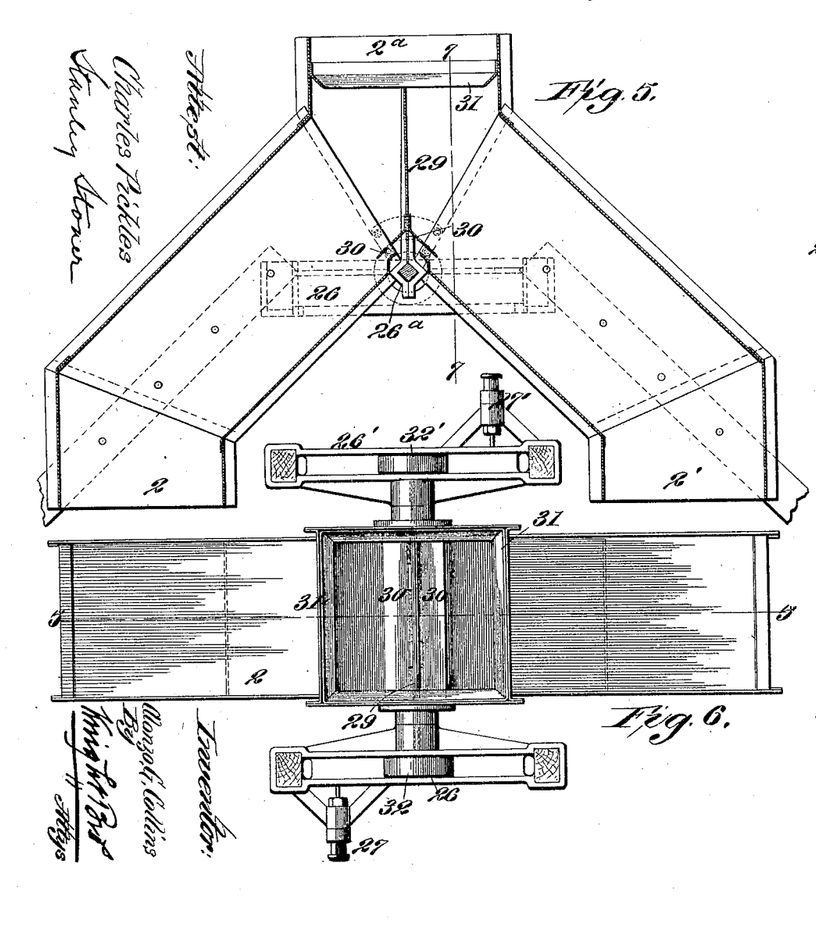
Fig. 5 illustrates a sectional view of the chutes along the line 5 5 of Fig. 6.
Fig. 6 illustrates a top view of the same.
Figure 8:
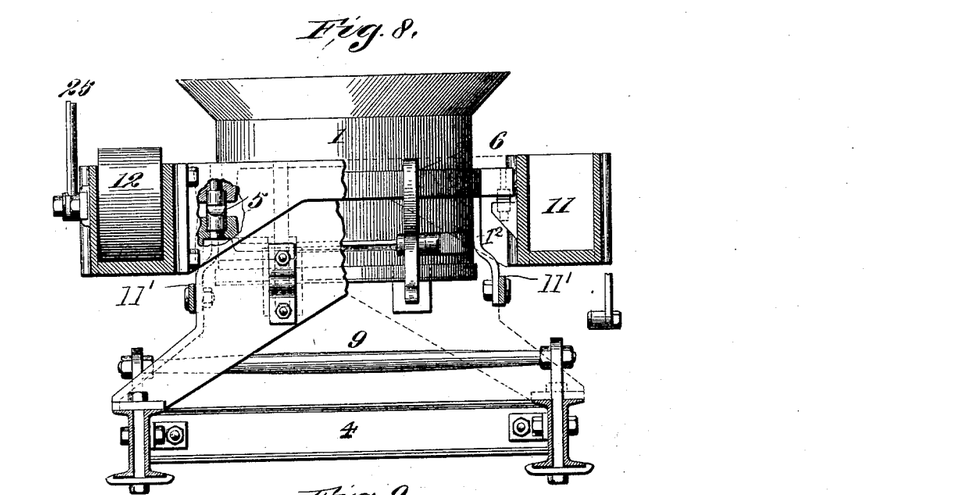
Fig. 8 illustrates an end elevation of one of the buckets and accompanying mechanism.

26 26', Figs. 6 and 7, are also channel-bars pivoted at $26^a$, the angle of separation of the chutes, said channel-bars carrying roller-weights 32 32'.

27 27' are pins on the bars 26 26', adapted to engage the loops 28 28', said loops being placed on the ends of the rods 25 25'.

29 is a valve in the hopper $2^a$ of the chutes, rigidly fastened to the pivot-shaft $26^a$ of the channel-bars 26 26'.

30 are deflectors secured to the bottom of the valve 29.

31 are deflectors in the hopper $2^a$.

Figure 9:
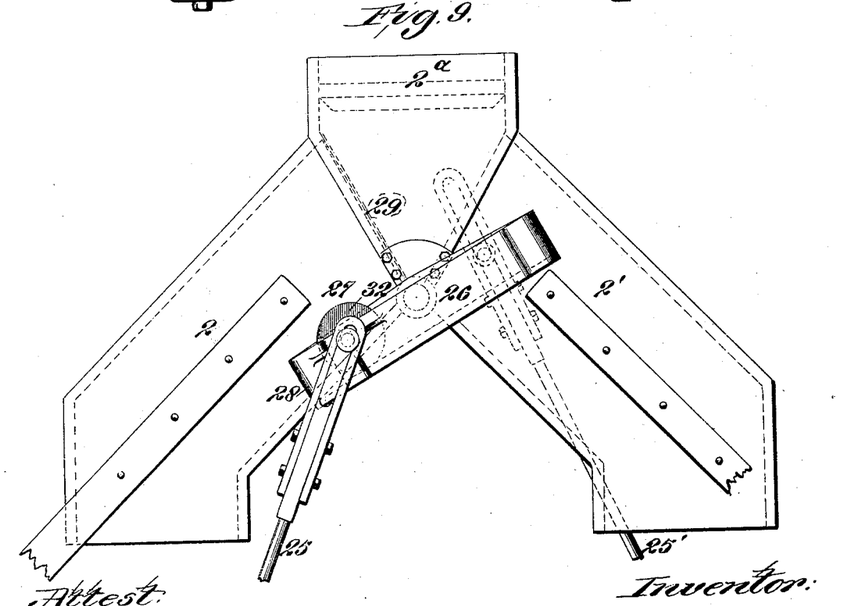
Fig. 9 illustrates in detail the chutes leading to the buckets, showing the method of turning the valve to direct the material into one or the other direction.

The operation of my device is as follows: The material is introduced through the hopper $2^a$. The valve 29 directs it through one or the other chutes 2 or 2', as shown in Fig. 9. It is discharged into one of the buckets, which is previously emptied, and consequently raised to the discharge end of chutes 2, Fig. 2. It will continue to fill until a sufficient amount is deposited therein to overcome the weight of the opposite end, when it will be lowered. The bottom 7 is held in place by the trip-hook 6 until the arm of 6 is struck by part 10, which disengages said hook from the bucket-bottom, causing said bottom to drop and discharge the contents thereof into hopper 3. As the bucket just described is lowered and emptied the opposite one is raised. The rolling weight 12 keeps the empty bucket down until a considerable amount of material is deposited in the raised bucket sufficient to overcome said weight. The buckets are compelled to move in the same vertical plane by means of the parallel bar attachment 11'.

The bottom 7 is kept open by means of bar 9 until after the empty bucket has commenced to rise, thus insuring its being wholly emptied. The arms 25 25', carried on channel-bars 11, operate to move the bars 26, which in turn operate the valve 29. The pin 27 moves in the sliding loop 28, which, aided by the rolling weight 32, serves to turn bar 26 and with it valve 29. The loop 28, however, prevents the said valve 29 from directing the material into the second bucket until the bottom of said second bucket is closed and hooked. This process of filling and emptying first one and then the other can be carried on indefinitely. Connecting-rod 21 is attached to an arm on bar 11, arranged to regulate the movement thereof, and is adapted to be moved by the oscillation of said bar. It opens and closes a semirotary valve in engine 22, and thus operates the piston-rod 23 and bell-crank lever 24 and charger-rod 24'. The motion thus imparted to the charger-chambers 16 brings said chambers first coincident with the passage 17 to receive material from 13 and then coincident with passage 19 to discharge the same. Thence it is directed through hopper 20 into hopper 3 to mix with the material already deposited there.

Figure 11:
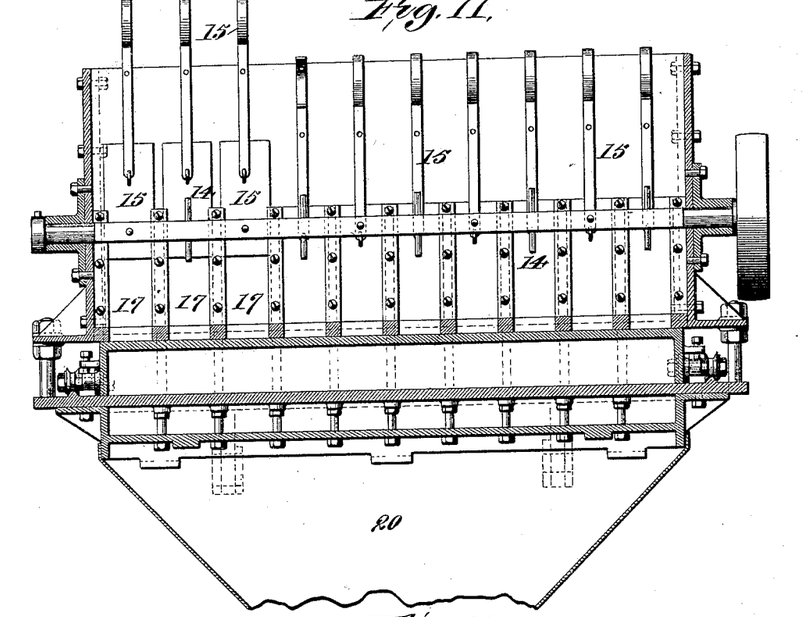
Fig. 11 illustrates in detail a sectional view of the upper portion of Fig. 10.
Figure 12:
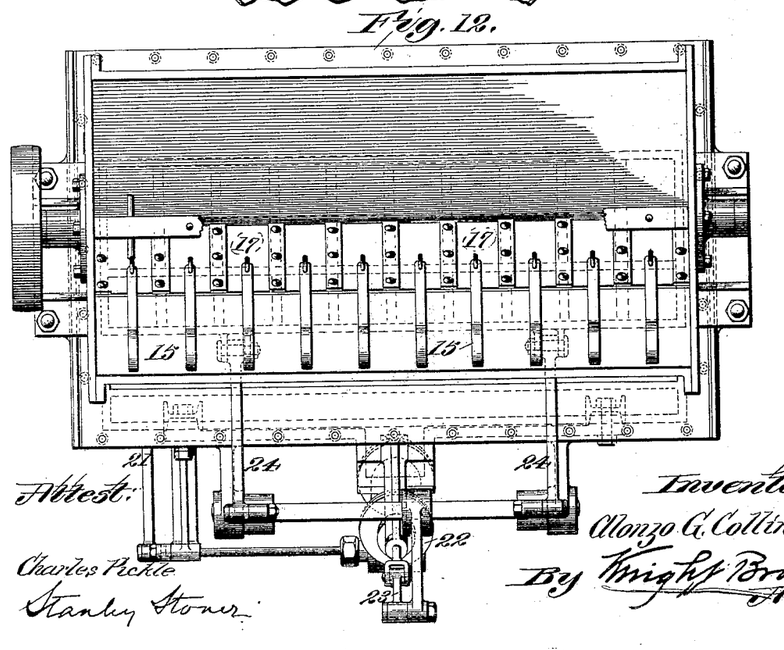
Fig. 12 illustrates a top view of the same.

The construction of hopper 13 is shown in Figs. 11 and 12. The drawings show it to be furnished with ten compartments, but it is obvious that any desired number may be used. At each emptying of the bucket 1 or 1' there is a discharge, by means of the construction already described, of a definite amount of material through 17, 16, 19, and 20. The amount of this discharge is governed by the valves 15. Assuming that the chambers 16, receiving material from hopper 13, carries the same amount as one of the buckets 1 1', then if three of the valves leading from hopper 13 were open, as shown in Fig. 11, for every one hundred parts emptied from bucket 1 there would be thirty parts emptied from the hopper 20. The material in 13 is kept thoroughly mixed by means of agitators 14. The charger-chambers 16, moved by connections which are controlled by the action of balance-bars 11, allow only the exact amount which they contain to be discharged simultaneously with the emptying of each bucket 1 1'.

While I have shown only one hopper 13, charger 16, engine 22, and their connections, it is evident that if more than two materials are to be mixed in given proportions additional hoppers like 13, chargers 16, engines 22, and their connections may be added, each hopper being supplied with a different material, the amount thereof to be discharged being regulated by the valves 15, the movement of the additional engines, and through them the movement of the chargers, being controlled by connecting the engine-valves to the oscillating bars 11.

Figure 13:
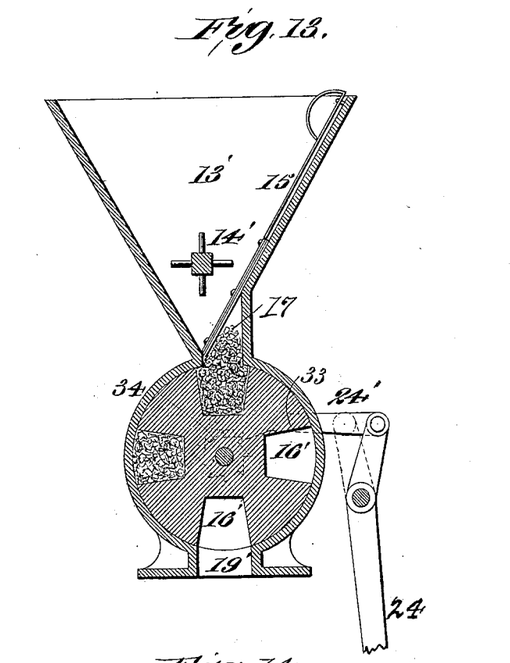
Fig. 13 illustrates in section a modification of the same.

Fig. 13 shows a modified form of construction of the part bearing chambers 16. Instead of a sliding device it shows a rotating cylinder provided with chambers 16'. The parts similar to those already described are marked by the same numbers bearing prime-marks. The cylinder bearing chambers 16' is rotated by means of a ratchet-wheel and pawl, said pawl being operated by the bell-crank levers 24 and charger-rod 24', already described.

Figure 14:
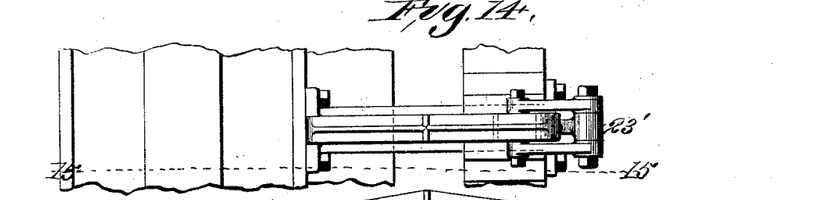
Fig. 14 illustrates a top view of a modified means for operating the device shown in Figs. 11, 12, and 13.
Figure 15:
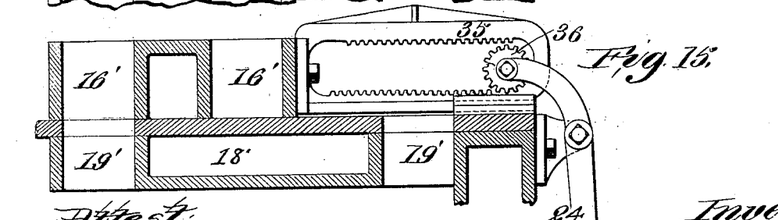
Fig. 15 illustrates in section, on line 15 15 of Fig. 14, a side view of the same.

While I have shown an engine as the means of transmitting the motion of the buckets 1 and 1' for emptying of the chambers 16 simultaneously with the emptying of said buckets, I do not limit myself to this means. It is evident that a ratchet-wheel 34 and a pawl device 35 may be used. It may also be done by means of a rack 35 and pinion 36, as shown in the modification illustrated in Figs. 14 and 15, said rack and pinion being provided with a suitable means for rotating said pinion continuously in one direction, as by belt and pulley, or the connecting-rod 21 may be connected directly to the chamber 16.

It is obvious that the hopper 13 may be placed in a position to discharge its contents into 2ᵃ, if desired, instead of into hopper 3, as shown.

I claim as my invention—

1. In a measuring and proportioning machine, the combination of a pivoted frame, buckets pivoted to said frame, hinged bottoms 7 7' to the buckets, counterbalancing-weights 8, 8' attached to the bottoms, trip-hooks 6 6' to lock said bottoms, obstructions 10 10' adapted to disengage said hooks when the bucket is lowered, bars 9 9' adapted to hold the bottoms of the buckets open after the buckets are emptied and until they commence to rise, rods 25 25' sliding joints attaching said rods to the pivoted frame carrying the buckets, said rods controlling a valve situated in a hopper, and means for depositing material from said hopper into said buckets, substantially as described.

2. In a measuring and proportioning machine, the combination of a pivoted, oscillating frame, buckets carried by said frame, chutes for depositing material into the buckets when in their raised position, a valve located at the junction of said chutes, a frame to which said valve is secured, rolling weights in said frame, rods connecting said frames, and means whereby said rods are adjustably secured to said oscillating frame, having a slot-and-pin connection with said valve-frame, substantially as set forth.

3. In a measuring and proportioning machine, the combination of a pivoted oscillating frame, the buckets, the chutes conveying the material to the buckets, a hopper into which the material is deposited, a hopper or hoppers for containing a second, third or more material or materials, a charger or chargers located below said last-mentioned hopper or hoppers, and means connected to said oscillating frame for operating the charger or chargers, substantially as set forth.

4. In a measuring and proportioning machine, the combination of a pivoted, oscillating frame, a bucket carried by each end of said frame, chutes for depositing material into said buckets when in their raised position, means for controlling the passage of said material to said buckets, a hopper or hoppers for containing a second or more material or materials, a charger or chargers under the last-mentioned hopper or hoppers, and means for connecting with said oscillating frame for operating charger or chargers, substantially as set forth.

5. In a measuring and proportioning machine, the combination of a pivoted, oscillating frame, a bucket carried by each end of the frame, chutes for depositing the material into said buckets when in their raised position, means for controlling the passage of the material through said chutes, a hopper for receiving a second material, a charger located under said hopper, an engine connected with said charger, and a rod forming a connection between the valve of said engine and said oscillating frame; substantially as and for the purpose set forth.

6. In a measuring and proportioning machine, the combination of a pivoted, oscillating frame, a bucket carried by each end of said frame, means for depositing material in said buckets when in their raised position, a hopper for containing a second material, an agitator 14 located in said hopper, valves 15 to control the discharge of material from said hopper 13, a charger 16 to receive said material, and a means for controlling the movement of said charger by the oscillation of said above-mentioned frame, substantially as described.

7. In a measuring and proportioning machine, the combination of a pivoted, vertically-oscillating frame, buckets carried at each end of said frame, a series of hoppers for containing materials, charger located below said hoppers, and means connected with said oscillating frame for operating said charger, substantially as described.

ALONZO G. COLLINS.

In presence of—
  STANLEY STONER,
  A. C. BROWN.